(12) United States Patent
Azevedo et al.

(10) Patent No.: US 11,591,060 B2
(45) Date of Patent: Feb. 28, 2023

(54) TETHERED AERIAL SYSTEM AND TETHER CABLE

(71) Applicant: ALTAVE INDÚSTRIA, COMÉRCIO E EXPORTAÇÃO DE AERONAVES S.A., São José dos Campos (BR)

(72) Inventors: Bruno Avena de Azevedo, São José dos Campos (BR); Ismael Jorge Costa Neto, São José dos Campos (BR); Gilson Vicente Soares Júnior, São José dos Campos (BR); Arthur Silva Costa Ferreira, São José dos Campos (BR)

(73) Assignee: Altave Industria, Comercio Exportacao De Aeronaves S.A., Sao Jose dos Campos (BR)

( * ) Notice: Subject to any disclaimer, the term of this patent is extended or adjusted under 35 U.S.C. 154(b) by 0 days.

(21) Appl. No.: 16/348,123

(22) PCT Filed: Nov. 7, 2016

(86) PCT No.: PCT/BR2016/000119
§ 371 (c)(1),
(2) Date: May 7, 2019

(87) PCT Pub. No.: WO2018/081879
PCT Pub. Date: May 11, 2018

(65) Prior Publication Data
US 2019/0359308 A1    Nov. 28, 2019

(51) Int. Cl.
*B64B 1/50* (2006.01)
*B64B 1/62* (2006.01)
(Continued)

(52) U.S. Cl.
CPC .................. *B64B 1/50* (2013.01); *B64B 1/62* (2013.01); *B64B 1/66* (2013.01); *B64F 1/14* (2013.01); *H02N 3/00* (2013.01)

(58) Field of Classification Search
CPC ..... B64F 1/14; B64B 1/50; B64B 1/62; B64B 1/66
See application file for complete search history.

(56) References Cited

U.S. PATENT DOCUMENTS

| | | | | |
|---|---|---|---|---|
| 4,402,479 A | * | 9/1983 | Phipps, III | B64B 1/50 244/116 |
| 4,842,221 A | * | 6/1989 | Beach | B64B 1/50 244/33 |

(Continued)

FOREIGN PATENT DOCUMENTS

WO    WO2014200566    12/2014    ............... B64B 1/50

OTHER PUBLICATIONS

International Preliminary Report on Patentability issued in application No. PCT/BR2016/000119, dated May 7, 2019 (16 pgs).

(Continued)

*Primary Examiner* — Tye William Abell
(74) *Attorney, Agent, or Firm* — Neal Marcus

(57) ABSTRACT

A tethered aerial system includes an on-board fuel cell for powering on-board electronics and a tether cable which is less conductive than air. The tether cable includes a pipe for carrying a flow of gas to the fuel cell and/or maintain the gas level in a lighter-than-air platform, so that the tethered aerial system can remain operational for an extended period of time. The system is particularly applicable for maintaining communication links in remote areas, agriculture and applications in the IoT (Internet of Things), event coverage, interactive marketing, for post-disaster situations in rural (Continued)

areas and at mining sites or construction sites in remote environments. The system also is immune to rays.

12 Claims, 4 Drawing Sheets

(51) Int. Cl.
*B64B 1/66* (2006.01)
*B64F 1/14* (2006.01)
*H02N 3/00* (2006.01)

(56) References Cited

U.S. PATENT DOCUMENTS

| | | | | |
|---|---|---|---|---|
| 6,325,330 | B1* | 12/2001 | Lavan, Jr. | D07B 1/147 244/33 |
| 7,046,934 | B2* | 5/2006 | Badesha | H04B 10/118 398/131 |
| 8,485,465 | B2 | 7/2013 | Lee | 244/30 |
| 9,290,258 | B1* | 3/2016 | DeVaul | B64B 1/62 |
| 2012/0235410 | A1 | 9/2012 | Serrano | 290/50 |
| 2013/0115544 | A1* | 5/2013 | Davidson | H02K 7/1807 290/1 A |
| 2013/0299629 | A1* | 11/2013 | Lee | B64B 1/56 244/33 |
| 2014/0251743 | A1* | 9/2014 | Childress | B64C 39/022 191/12 R |
| 2014/0374537 | A1* | 12/2014 | Anderson | G01W 1/08 244/33 |
| 2015/0336685 | A1* | 11/2015 | Wan | B64B 1/005 244/2 |
| 2018/0050797 | A1* | 2/2018 | Palmer | B64B 1/62 |
| 2018/0094619 | A1* | 4/2018 | Sellers | B64C 31/06 |
| 2022/0081097 | A1* | 3/2022 | White | B64B 1/66 |

OTHER PUBLICATIONS

International Search Report and Written Opinion issued in application No. PCT/BR2016/000119, dated Oct. 30, 2017 (25 pgs).

* cited by examiner

TETHERED AERIAL SYSTEM AND TETHER CABLE

FIELD OF THE INVENTION

The present invention addresses to the field of technologies related to tethered aerial vehicles and means for maintaining continuous operations with reduced chances of attracting atmospheric discharges.

BACKGROUND OF THE INVENTION

The tethered aerial vehicle, especially the tethered balloon or tethered aerostat, is the highlight for solutions in communication, military monitoring and monitoring of major events.

In order to have on-board electronics with high operating time, the types of cable used for adaptation in these aerostats are generally electro-optical-mechanical or electro-mechanical. The on-board devices are powered electrically by the energy carried by these cables.

From this principle, it is understood that the metal structure and electronic components on-board in the balloon and the ground are electrically connected, thus forming a lightning arrester for the electric discharges in its vicinity. Said electric connection causes the electric potential at the balloon height to equal the electric potential of the earth, so that, electrically speaking, it is as if the earth rises to the height of the balloon, making it very lightening attractive. For this reason, this technology, when not equipped with a special protection system, has its use restricted at times when the weather is prone to atmospheric discharges.

The protection systems existing in the prior art comprise the arrangement of a copper layer surrounding the core of the cable, but customary regulations in the field of electrical grounding of structures report that the minimum gauge of a copper cable, to obtain the proper protection, is 35 mm, which makes the cable extremely heavy. As an example, the weight for a cable of 250 meters, with the aforementioned copper protection, is 89.25 kg, which makes it impossible to use aerostats with a volume of up to a few hundred cubic meters. In addition, a device is further needed to pick up the rays, which increases the system weight and causes damage to the balloon due to the high temperature to which lightning protectors are subjected when conducting electric current.

STATE OF THE ART

Document US2014/0374537A1 relates to an aerostat provided with self-powering means comprising mechanical support fiber, gas tube, high voltage electrical conductor and fiber optics. The expected lift gas is strictly hydrogen. The aerostat is inflated and maintained in this state with hydrogen gas, and to remain inflated, the gas is carried from the ground to the balloon through a pneumatic tube. The payload is supplied by the energy provided by an aerogenerator built into the aerostat or generated by a fuel cell on the ground, and delivered to the payload through electrical conductors by the tether cable. The sending and receiving of data is by fiber optics, wherein one of the main disadvantages of the disclosed content is that the protection provided against lightning consists of lightning arrester and grounding, the ground wire being extremely heavy, which may make the technology unfeasible in cases where the aerostat has less than 1000 cubic meters of lifting gas.

In patent document U.S. Pat. No. 8,485,465 B2, the cable comprises a mechanical support fiber and one or two gas tubes, in addition to high voltage electrical conductor and fiber optics. The lifting gas is strictly the helium gas, the aerostat being inflated and maintained inflated with helium, and the gas being carried from the ground to the balloon through a two-way pneumatic tube. The electrical supply of on-board systems is delivered to the aerostat from the ground and carried by electrical conductors. The transmission of data is obligatorily made by fiber optics.

Document U.S. Pat. No. 6,325,330 B1 comprises a mechanical support fiber with high voltage electrical conductor and fiber optics, and considers the use of a new material for electrical insulation. In this case, DC electrical energy comes from the energy generating ground base and data transmission is restricted to the use of fiber optics.

In document WO2014/200566 A2, a reference is made to the use of mechanical support fiber, one or two gas pipes, high voltage electrical conductor, fiber optics and electric ground grid. It is envisaged that the aerostat is inflated and maintained in this state with helium gas and, to remain inflated, the gas is carried from the ground to the balloon via two-way pneumatic tube. The powering of on-board systems is also disadvantageously made by sending energy from the ground, and the same energy is carried by electrical conductors. In addition, the technology of WO2014/200566 A2 depends on the fiber optics to perform data transmission and reception, and, further disadvantageously, the intended protection is only by lightning arrester and grounding, wherein the ground wire is very heavy, which once again may make the technology unfeasible.

Advantages of the Invention

In order to overcome the deficiencies of the prior art as discussed above, the present invention proposes disruptive solutions applied in tethered aerial vehicles so that continuous operations with reduced chances of attracting atmospheric discharges are feasible.

Differently to what already forms part of the state of the art, the present invention innovates by disclosing an electric non-conductive cable with mechanical support fiber and gas tube, in addition to the fact that there is further the possibility of said cable may or may not have fiber optics.

In the case of the aerostats, which are tethered aerial vehicles of particular interest for this invention, the lifting gas of the aerostat disclosed herein can comprise hydrogen and helium, wherein the aerostat can be inflated preferably with helium and maintained inflated with hydrogen. To remain inflated, the gas is carried from the ground to the aerostat through a pneumatic tube.

The fact that the aerostat is able to keep supplied with lifting gas uninterruptedly allows for prolonged operations. The aerostat can be in operation for months or even years without being obliged to descend to be supplied. This is very important, for example, for telecommunications applications, wherein the signal service has to be continuous. Normally, balloons without on-operation supply technology do not last for more than 60 days, since there is no 100% tight material. This is due to the phenomenon of molecular effusion, and even with the use of metallic reservoirs, a gradual loss of gas mass from the interior is expected.

Regarding the power supply of the on-board electronics on the aerostat disclosed herein, the generation of energy by an on-board fuel cell is disclosed.

It is worthy to highlight that the hydrogen gas rising to the aerostat, in the present invention, has two purposes. This makes the technology optimized, and the use of energy from the fuel cell makes the aerostat sustainable, and this is a type of clean energy.

The present invention further provides for the exchange of information via fiber optics or, further, without the use of wires. Furthermore, in addition to the availability for the telecommunication area, said aerostat has the capability to promote visual monitoring.

Another feature of the present invention is that the aerostat has automatic deflation, which prevents unforeseen flights, unwanted occurrences and even serious accidents.

Finally, it should be mentioned as an additional advantage that all the elements of the cable are non-electrical conductors and, therefore, influence much less the electric potential lines of the atmosphere compared to the technologies that have hitherto existed.

BRIEF DESCRIPTION OF THE INVENTION

The present invention relates to a tethered aerial system comprising electrical energy self-generating means for powering the on-board electronics and prolonged flight time lifting with mitigation of risks of atmospheric discharges.

Additionally, the present invention further discloses a tethering cable (3) comprising non-conducting elements having such features as to make this cable less conductive than air. In this regard, further features are disclosed in addition to their mechanical properties, such as, for example, pneumatics, since said cable comprises a gas passage tube that maintains, for example, a lighter-than-air platform inflated with the level of gas required for long-term flight maintenance, longer than one month and that may reach years.

BRIEF DESCRIPTION OF THE DRAWINGS

For the full and complete visualization of the object of this invention, there follow figures to which reference is made, as follows.

DETAILED DESCRIPTION OF THE INVENTION

Figure 1:
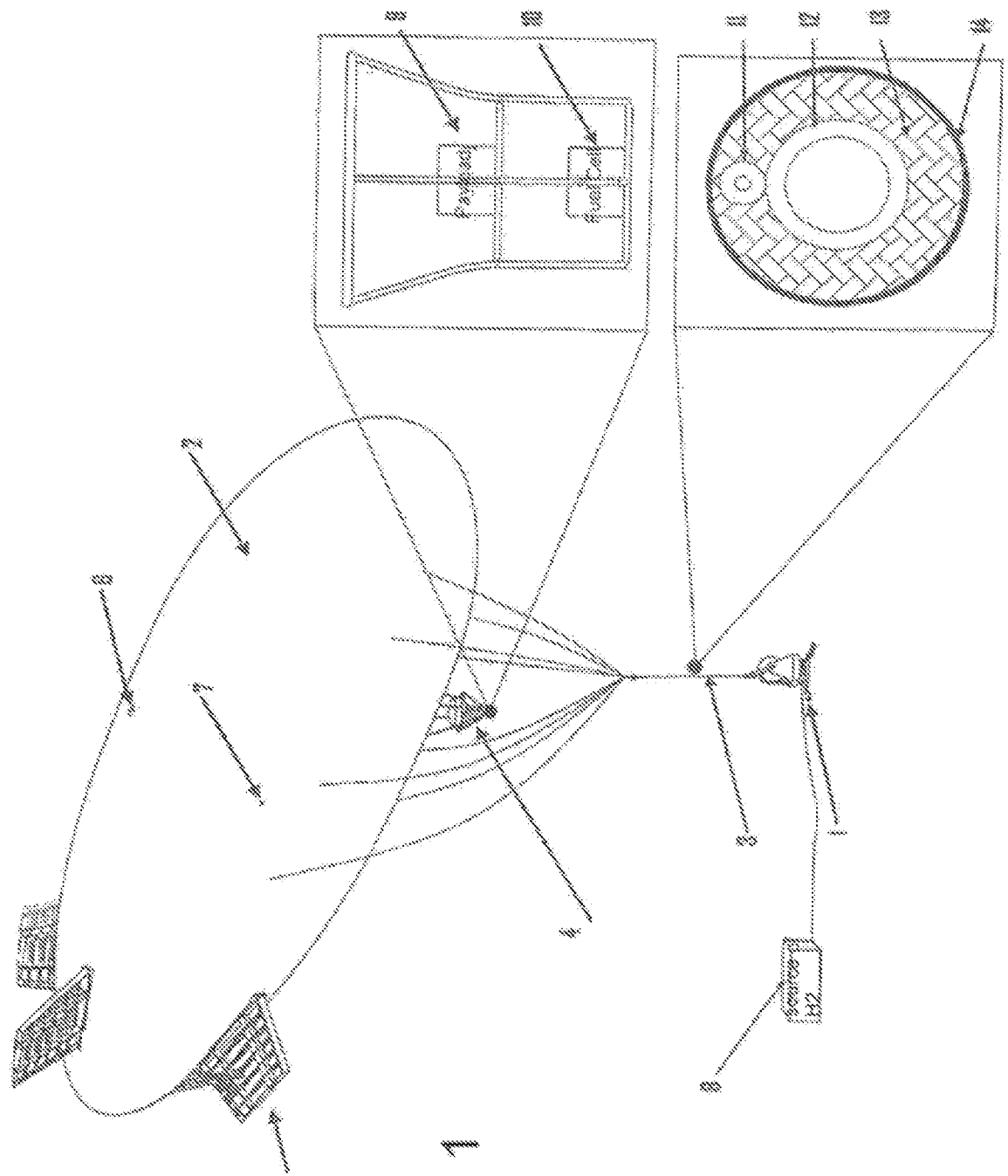
FIG. 1 is a graphical representation of the present invention, with details of the tethered air system and the tethering cable (3) disclosed herein.

The present invention relates to a tethered aerial system comprising electrical energy self-generating means by fuel cell (10) for powering its on-board electronics, comprising an aerial vehicle (2) and payload (9), wherein said aerial vehicle (2) is connected to a gas source (8) on the ground by a tethering cable (3) which is an atmospheric discharge attraction preventer.

The aerial vehicle (2) may be selected from a group of options comprising: a lighter-than-air platform, a rotary wing aerial vehicle, a fixed wing aerial vehicle or a combination thereof.

Figure 2:
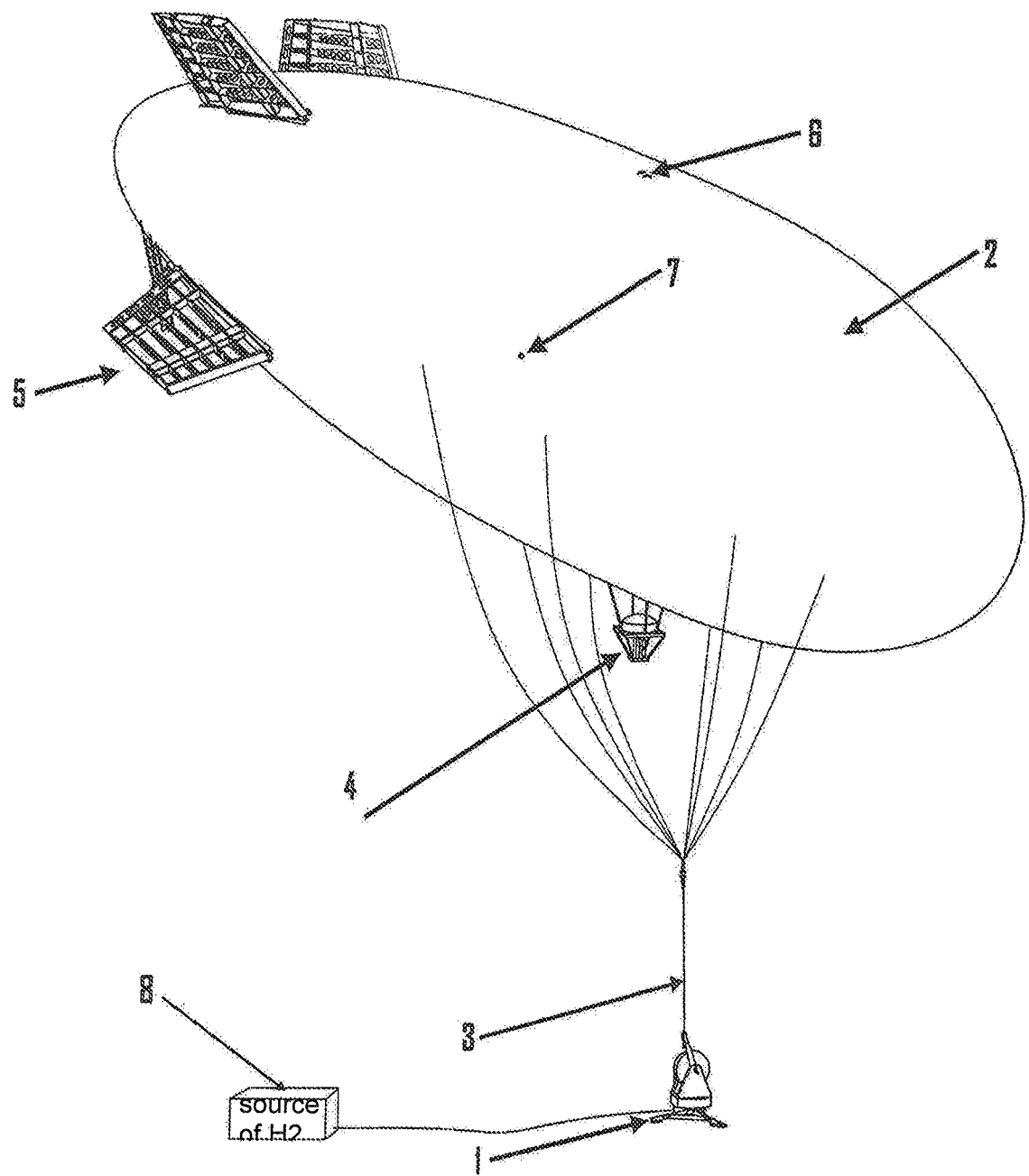
FIG. 2 is a detailed graphical representation of the tethered air system of the present invention with the aerial vehicle (2) being a lighter-than-air platform.
Figure 3:
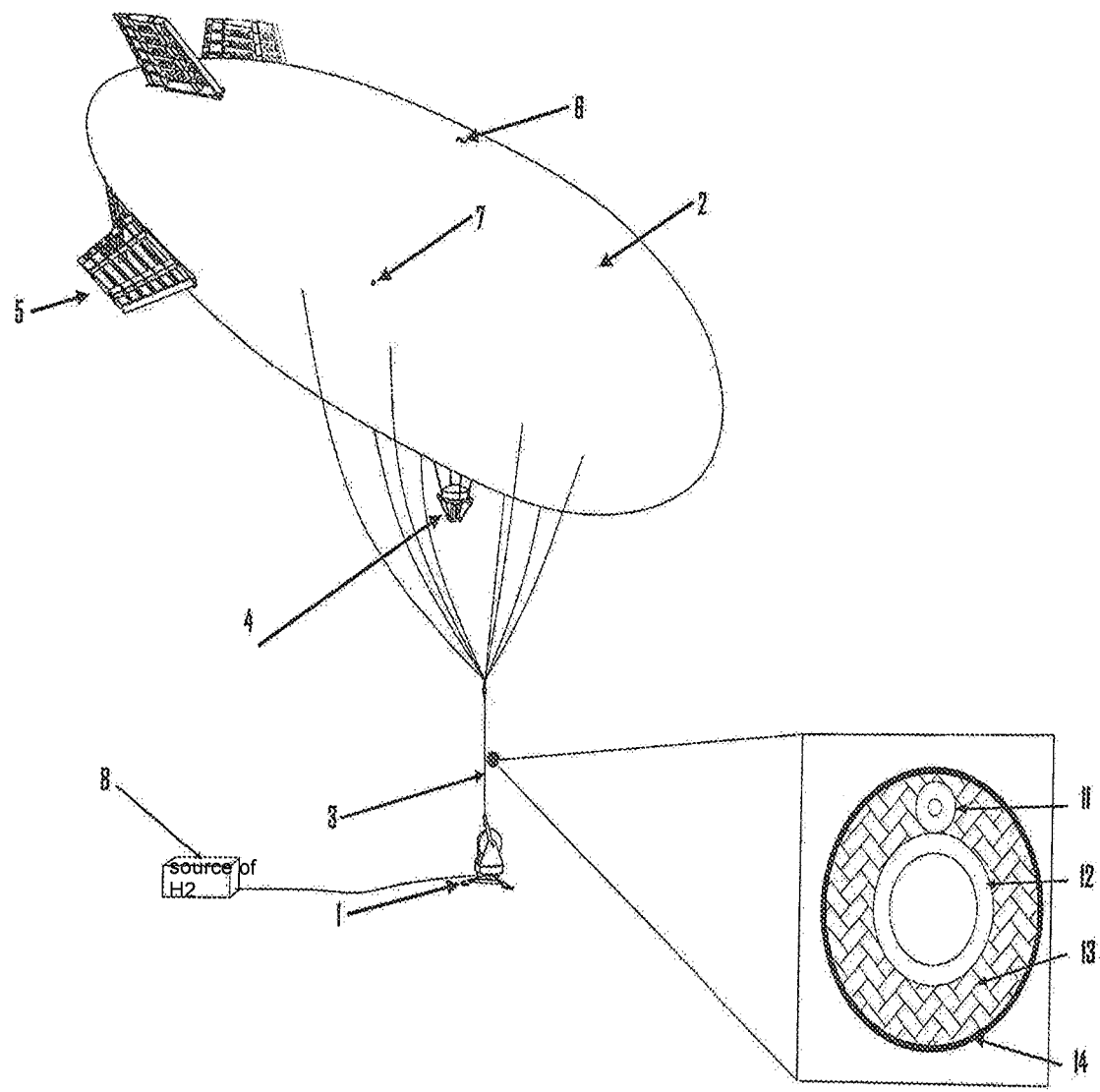
FIG. 3 is a detailed graphical representation of the tethering cable (3) of the present invention.
Figure 4:
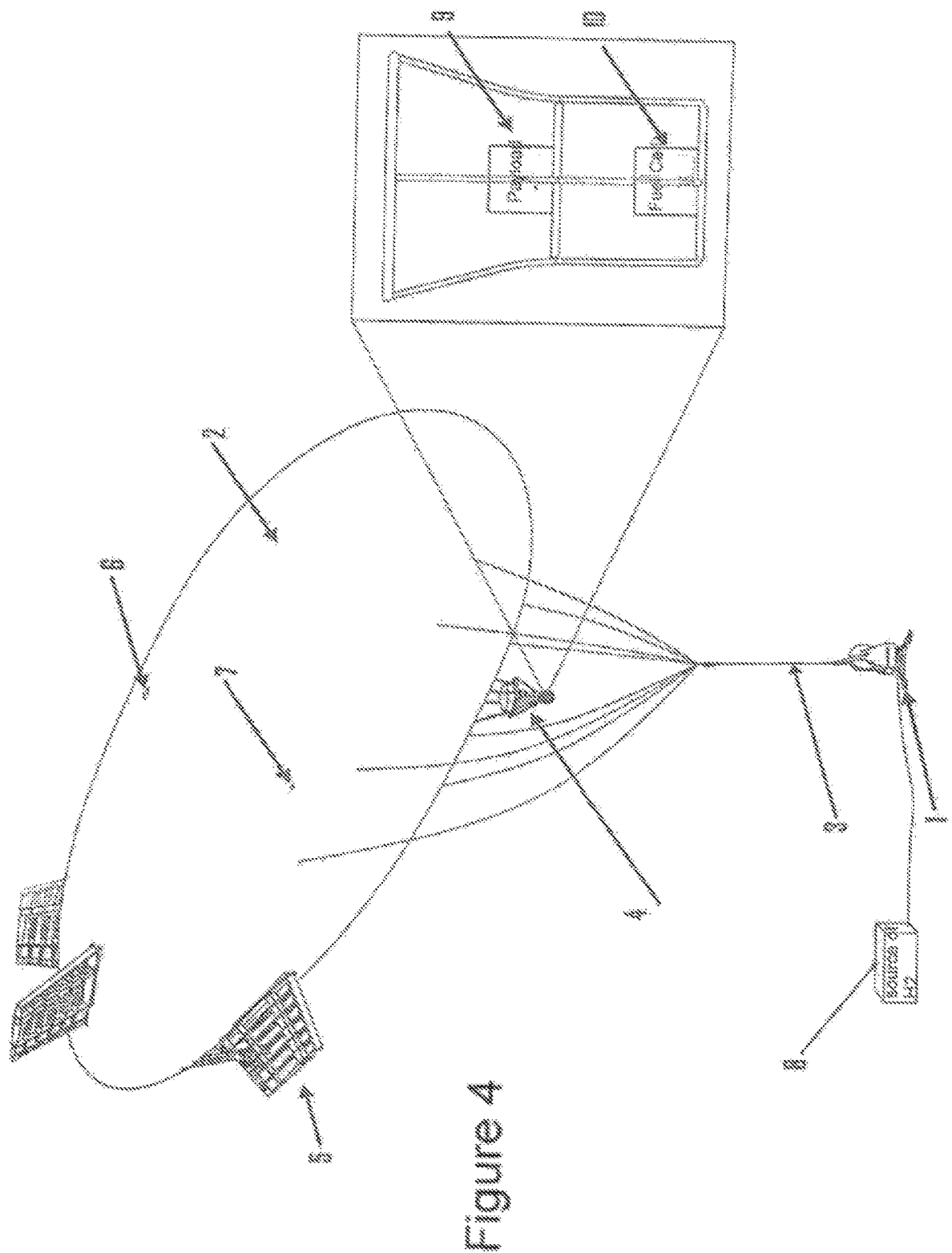
FIG. 4 is a detailed graphical representation of the aerial vehicle (2) of the lighter-than-air platform type, emphasizing the visualization of the on-board electronics.

When the option is made to use the lighter-than-air platform type aerial vehicle (2), which is the preferred option of the present invention, as illustrated in the examples of FIGS. 1 to 4, it is necessary to use the following additional elements with the system: a gondola (4), stabilizing empennages (5), a deflation device (6), and a light indicating device (7).

In this preferred option of the aerial vehicle (2), said lighter-than-air platform preferably comprises an aerostat, in a preferred cigar shape and aerodynamically designed to withstand winds of more than 100 kilometers per hour, preferably made of a composite material of polyurethane thermoplastic (TPU) for the inner envelope and nylon for the outer envelope, further presenting preferred dimensions of up to 26 meters in length, up to 480 cubic meters in volume and flying at a height of up to 1000 meters. Such a lighter-than-air platform has the aforementioned stabilizing empennage (5) and the following safety actuators: the deflation device (6) and the light indicating device (7).

In the gas source (8), the gas preferably is hydrogen. However, when the gas is used only for maintaining the aerostat inflated, it may be the helium gas.

With respect to the electrical energy self-generating means for powering the on-board electronics of an aerial vehicle (2), four different options are preferably provided:

Wind: Energy generated by aerogenerators, which are devices with wind turbines adjusted to be built in aerostats. This type of technology is more flexible than traditional towers and its generation has the advantage that at balloon operating altitude, the winds are stronger and more consistent than those achieved by traditional tower mounted turbines.

Fiber optics (Power over Fiber—PoF): In case the tethered aerostat has fiber optics in its cable, the same can carry optical power through a laser transmitted by it, which is used as an energy source, instead of, or as well as carrying data. This enables remote power supply while providing electrical insulation between the on-board system and the power supply.

Solar: Solar panels that generate electricity can be installed in the envelope of the aerostats and produce energy for the payload that is in the aerostat.

Fuel cell (10): The fuel cell is a component that converts the chemical energy of a fuel (in this case hydrogen gas) into electrical energy by means of a chemical reaction of positively charged hydrogen ions with oxygen or another oxidant. Fuel cells are different from batteries. The fuel cell needs a continuous source of fuel and oxygen or air to maintain the chemical reaction, whereas in a battery the chemicals present in the battery are fixed to react with one another and generate an electromotive force (EMF). Fuel cells can produce electricity continuously during the time fuel and oxygen inputs are fed.

When using the fuel cell (10), which is the preferred embodiment of the present invention, the generation of energy depends on hydrogen gas for the production of electrical energy, and therefore, in this branching of the product, the hydrogen gas may be used for maintaining the lighter-than-air platform inflated, allowing the flight for long periods, in addition to being the fuel to generate electrical energy supplying the on-board electronics.

In the wind, solar and laser power generation options, no chemical reaction with hydrogen gas is used; so, in the case of the use of lighter-than-air platforms in the present invention, they may be inflated or maintained with helium gas and/or hydrogen gas, and the maintenance of the flight is ensured by carrying this gas through the tube (12) contained in the tethering cable (3), which will be detailed below.

In the preferred embodiment of the present invention, that is, the use of lighter-than-air platform, a gondola (4) is attached to such a platform and contains its electronic devices. In the gondola (4), the fuel cell (10) and the payload (9) are installed, wherein, in addition, circuits are inserted in said payload (9) that are responsible for telecommunications and/or visual monitoring and applying of the safety devices of deflation (6) and light indication (7).

In the present invention, the fuel cell (10) is responsible for the generation of continuous electrical energy for the payload (9), whereas if energy sources such as solar and wind are used, the generation depends on environmental factors (cloudiness, wind speed, day length and solar incidence), and to cover the time length without generation there are two options: to arrange a cable with an electrical conductor for the energy to be carried from the base on the ground, or to place batteries and energy converters on board the aerostat causing an extra weight that is not ideal for the system. Neither case is desirable for the present invention because if electrical conductors are used, the system loses the ability to be lightning-free; in addition, batteries and converters are generally very heavy and the purpose of the present invention is to be as lightest as possible.

Another plausible conclusion is that the system with energy generation by the fuel cell has a lower cost in relation to the platform than other self-powered electrical technologies for the payload, since the aerial vehicle (2), especially lighter-than-air platform type, can be of a smaller size.

In addition, the present invention further discloses a tethering cable (3) preferably comprising a tube for transporting hydrogen or helium gas (12) made of nylon or Teflon™ polytetrafluoroethylene (PTFE), encased with a synthetic fiber for mechanical support (13), preferably of Vectran™ polyester fiber, with mechanical strength functionality, wherein externally it is possible to have a coating of electrical insulating material (14), preferably PTFE or Hytrel™ thermoplastic elastomer. Additionally, it is further possible to have or not a fiber optics (11) within the tethering cable and passing through the synthetic fiber (13).

The tethering cable (3), which has one end connected to the lighter-than-air platform, is attached to the ground by means of a tethering device (1) directly connected to a gas source (8), which preferably operates by hydrogen gas cylinders, hydrocarbon and alcohol reforming or, further, by electrolysis of the water. The tethering device (1) must necessarily be responsible for the tethering of the platform and its control on the ground, and must preferably be able to rotate about its vertical and horizontal axes and favoring the winding of the tethering cable (3) with little or no friction. Preferably, this device should be of small size with good portability.

Accordingly, the tethering cable (3) provides the flow of hydrogen or helium gas through the tube (12), which may be responsible for maintaining the flight potential of the aerial vehicle (2) of the lighter-than-air platform type, and specifically in case the gas is hydrogen, to generate electrical energy for the platform payload. It is only possible to pass one gas at a time through the tethering cable (3). The aerial vehicle (2) is inflated with helium or hydrogen by a specific hose to inflate the platform, starting entirely empty. After the same vehicle (2) is ready to fly, the tube (12) from the tethering cable (3) is installed and the hydrogen can then be delivered by this tube (12), which will supply the aerial vehicle (2) of lighter-than-air platform and the fuel cell (10). Or else, if in some special case there is no fuel cell (10), the gas passing through the tube (12) of the tethering cable (3) may be helium, also being delivered by the same tube (12) to maintain the platform inflated.

Fiber optics (11) is optional for the cable, as it has the utility of transferring data at rates of more than 1 Giga Byte per second. However, if the fiber is not used, wireless linking means for data transfer are further provided in the present invention. Vectran synthetic fiber (13), which provides mechanical strength of more than 1 ton, supports tension on the cable due to the balloon. Finally, the outer cover of electrical insulation material (14) causes the cable to not be conductive primarily on its surface, where the cable is vulnerable to moisture and impurities of the atmosphere.

The present invention enables the establishment of point-to-point and multipoint telecommunication links as well as for real-time video and data transmission.

The content disclosed herein especially addresses to communication links in remote areas, agriculture and IoT (Internet of Things) applications, coverage of events, interactive marketing and post-tragedy solutions, for example, wherein it is common a lack of access to traffic data, voice or internet, in rural areas, mining or construction sites in remote environments.

By placing itself in a privileged height, providing for mobility and height flexibility, the aerostat herein is capable of providing communication links in remote areas. In this situation the present invention functions as an ERB (Base Radio Station) and acts either as a transmitting station or as a relay station, according to the operator's need.

In urban events, which concentrate a large number of people, for example, where overhead of cellular lines is ordinary, the use of the present invention makes it possible to expand the telephone or internet network with existing operators.

Those skilled in the art will appreciate the knowledge presented herein and can reproduce the invention in the embodiments presented and in other variants within the scope of the appended claims.

The invention claimed is:
1. A tethered aerial system comprising:
an aerostat;
a payload configured to be carried by the aerostat;
an on-board electrical energy generator for powering on-board electronics and the payload, wherein the on-board electrical energy generator comprises a fuel cell configured to run on hydrogen gas; and
a tethering cable connecting the aerostat to a hydrogen gas source on a ground, wherein the tethering cable comprises material that is electrically non-conductive and less conductive than air to prevent atmospheric discharge attraction and wherein the tethering cable includes a tube for supplying the hydrogen gas to the aerostat for inflating the aerostat and for supplying the fuel cell for the on-board electrical energy generator, wherein maintenance of a flight is ensured by delivery of the gas by the tube contained within the tethering cable;
wherein the tethering cable has a first end that is configured to connect to the aerostat of the tethered aerial system and a second end configured to be fixed to the gas source on the ground; and
wherein the tethering cable is configured to provide the flow of hydrogen gas through the tube for maintaining flight capacity of the aerostat and to act as a fuel feed for the fuel cell to generate electrical energy for the on-board electronics and the payload of the tethered aerial system.

2. The system according to claim 1, wherein the payload comprises circuits responsible for performing telecommunications and visual monitoring.

3. The system according to claim 1, wherein the tube for carrying hydrogen is made of nylon or polytetrafluoroethylene.

4. The system according to claim 1, wherein the material includes a mechanical support synthetic fiber surrounding the tube and a coating of electrical insulating material covering the mechanical support synthetic fiber and wherein the coating of electrical insulating material is formed of polytetrafluoroethylene or a thermoplastic elastomer.

5. The system according to claim 1, wherein the tethering cable is configured for control of the aerostat on the ground, and wherein the tethering cable is configured to permit the aerostat to rotate around its vertical and horizontal axes, allowing the winding of a safety cable.

6. The system according to claim 1, wherein the material includes a mechanical support synthetic fiber surrounding the tube and a coating of electrical insulating material covering the mechanical support synthetic fiber and wherein the synthetic fiber for mechanical support is made of a polyester fiber, with a mechanical strength functionality.

7. The system according to claim 6, further including fiber optics passing through the synthetic fiber, which are coated with an electrical insulating material.

8. The system according to claim 1, wherein the aerostat includes rotary wings, fixed wings, or a combination thereof.

9. The system according to claim 8, wherein the aerostat includes on-board electronics, stabilizing empennages, a deflation device, and a light indicating device.

10. The system according to claim 9, wherein the aerostat has one or more of the following features: an oblong elliptical shape; comprising an inner envelope of thermoplastic polyurethane (TPU) and an outer envelope of nylon; up to 26 meters in length; up to 480 cubic meters in volume; and flying to a height of up to 1000 meters.

11. The system according to claim 9, wherein the deflation device, and the light indicating device are configured as safety devices.

12. The system according to claim 9, wherein the on-board electronics comprise drive circuits for the deflation device and the light indication safety device, the on-board electrical energy generator, and the payload.

* * * * *